UNITED STATES PATENT OFFICE.

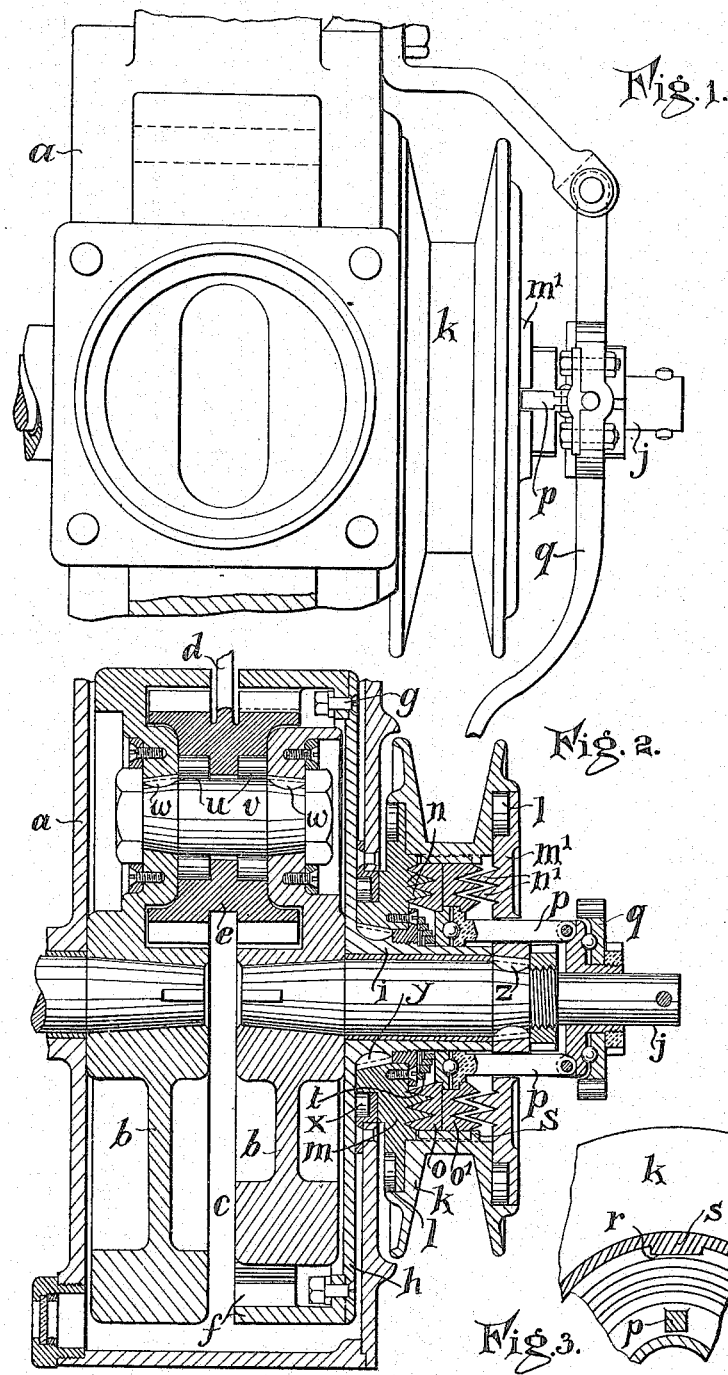

CHARLES EDWIN POLLARD, OF JOHANNESBURG, TRANSVAAL, SOUTH AFRICA.

TWO-SPEED GEARING.

1,122,301.        Specification of Letters Patent.        Patented Dec. 29, 1914.

Application filed August 13, 1913. Serial No. 784,545.

*To all whom it may concern:*

Be it known that I, CHARLES EDWIN POLLARD, a British subject, and a citizen of the Union of South Africa, and resident of Fordsburg, Johannesburg, Transvaal, South Africa, have invented certain new and useful Improvements in Two-Speed Gearing, of which the following is a specification, such as will enable others skilled in the art to which it appertains to make and use the same.

This invention relates to two speed gears for use in connection with internal combustion engines and refers to that type of gear in which a toothed pinion is fixed to the connecting rod of the engine concentric with the crank pin and an annular toothed wheel meshing with the said pinion is mounted co-axially with the crank shaft of the engine, the said annular wheel having on it a sleeve fitted around the crank shaft, clutch means being provided whereby the engine can be either coupled to the crank shaft or to the sleeve.

The present invention concerns particularly an improved method of effecting the coupling and consists chiefly in providing around the said sleeve a double grooved or multi-coned clutch capable of operation by means of an external lever so as to either engage the shaft or the annular toothed wheel, said clutch being always in engagement with the pulley or the like employed to convey the rotation of the engine to the machine or the like which is to be driven at the variable speed, it being understood that the movement of the clutch from out of engagement with the shaft and the annular wheel will allow the engine to run free.

The invention is particularly applicable to motor cycles, small motor cars and the like and can be equally well used for other purposes where a variation of the speed is required at various times and where the drive of the engine is to be disconnected from the pulley or equivalent.

An example of my invention is shown in the accompanying drawings the illustrations depicting a form very suitable for driving motor cycles and in which a grooved pulley for a V-shaped belt is employed.

Figure 1 is an external plan view of the crank case of the engine and shows the belt pulley and lever for operating the clutch. Fig. 2 is a sectional view of the apparatus of Fig. 1, and Fig. 3 shows a method of connecting the clutch to the pulley.

In these drawings, the crank case $a$ is of usual type and has mounted in it a fly wheel $b$ with the usual clearance $c$ for the piston rod $d$. The piston rod is shown furnished with a double pinion $e$, one side of which is in mesh with the annular wheel $f$ while the other side is for the time being inoperative the pinion $e$ being capable of being turned so that either side may be brought into engagement with the wheel $f$. This wheel $f$ is bolted at $g$ to the side plate $h$ which is integral with the sleeve $i$ the said sleeve being mounted upon the shaft $j$ of the engine and having arranged close to it the pulley $k$ which normally runs free on rollers $l$ mounted upon the cheeks $m$, $m'$, the inner surfaces of which are furnished with ribs $n$ and $n'$ respectively, both sets of ribs being of tapering cross section and adapted to be engaged one at a time by the multi-coned clutches or grooved clutch members $o$ and $o'$ which are capable of movement in a direction parallel to the axis of the shaft $j$ by means of links $p$ connected to the external lever $q$. The members $o$, $o'$, of the clutch are in permanent connection with the wheel $k$ by means of the recess $r$ common to members $o$ and $o'$ and the projection $s$ on the inner face of the wheel $k$. A coil spring $t$ is provided and its tendency is to press the links $p$ outwardly and to bring the clutch members $n'$, $o'$, into engagement.

As shown in Fig. 2 the members $o$ and $n$ of the clutch are in frictional engagement and the engine drives by means of the pinion $e$, wheel $f$, disk $h$, sleeve $i$, members $m$, $n$ and $o$ and the pulley $k$ so that the engine in this position of the clutch drives at low speed and it will be obvious that if the clutch members $o$, $o'$ are moved slightly to the right members $n$ and $o$ would be disengaged and the engine would run free while further movement to the right will bring the members $o'$, $n'$ into engagement and the drive will be from the shaft $j$ through members $m'$, $n'$ and $o'$ to the pulley $k$ which will run at the same speed as the engine.

It will be observed that the double pinion $e$ is mounted on anti-friction rollers $u$ around the crank pin $v$ which is secured by Woodruff keys $w$ to the fly wheel $b$. The disk $h$ is also mounted on rollers $x$ and the parts $m$ and $m'$ are secured to the sleeve and the shaft respectively by keys $v$ and $z$.

What I claim and desire to secure by Letters Patent is:—

1. In a two speed gearing the combination of a shaft; a pinion mounted eccentrically thereon; a toothed ring engaging said pinion; a driving means connected to the pinion and adapted to hold the pinion against rotation; a rotatable transmitting means; a pair of rotatable clutch members connected respectively with said shaft and ring; a slidable clutch device connected to said transmitting means and adapted to engage either clutch member; and means for sliding said device.

2. In a two speed gearing, the combination of a shaft; a pinion mounted eccentrically thereon; a connecting rod non-rotatably secured to the pinion; a side plate on said shaft; a toothed ring on the side plate and engaging the pinion; a pair of spaced check plates connected to the shaft and side plate respectively; a clutch device slidably between and adapted to engage said check plates; a transmitting means connected to said device; and means for sliding the device into engagement with one or the other check plates.

3. In a two speed gearing, the combination of a shaft; a crank thereon; a crank pin on said crank; a pinion on said crank pin; a connecting rod non-rotatably secured to the pinion; a side plate on said shaft; a toothed ring on the side plates and meshing with the pinion; a pair of spaced grooved check plates one of which is secured to said shaft and the other to said side plate; a pulley revolubly mounted on the edges of said check plates; grooved clutch members slidably mounted within said pulley and having oppositely disposed grooves adapted to engage the grooves of the check plates; and means for sliding said members.

In witness whereof I have hereunto set my hand in presence of two witnesses.

CHARLES EDWIN POLLARD.

Witnesses:
L. F. HELLIER,
C. B. HENDERSON.

Copies of this patent may be obtained for five cents each, by addressing the "Commissioner of Patents, Washington, D. C."